United States Patent [19]
Frederickson

[11] 3,768,611
[45] Oct. 30, 1973

[54] CENTRIFUGAL CLUTCH WITH C-SPRINGS
[75] Inventor: Robert Eugene Frederickson, South Gate, Calif.
[73] Assignee: McCulloch Corporation, Los Angeles, Calif.
[22] Filed: Mar. 28, 1972
[21] Appl. No.: 238,810

[52] U.S. Cl. ............. 192/105 BA, 192/76, 267/166
[51] Int. Cl. ............................................. F16d 43/14
[58] Field of Search ............... 192/105 BA, 105 BB, 192/103 B, 105 CD, 76, 89 R

[56] References Cited
UNITED STATES PATENTS

| | | | |
|---|---|---|---|
| 1,846,766 | 2/1932 | Starkey et al. | 74/6 |
| 2,143,173 | 1/1939 | Shaff | 192/30.5 |
| 2,902,128 | 9/1959 | Savage | 11/104 |
| 3,171,283 | 3/1965 | Giometti | 74/6 |
| 3,306,409 | 2/1967 | Giometti | 192/104 |
| 2,243,565 | 5/1941 | Kimball et al. | 192/105 BA |
| 2,572,528 | 10/1951 | Selander | 192/105 CD |
| 2,947,399 | 8/1960 | Moore et al. | 192/105 BA |

FOREIGN PATENTS OR APPLICATIONS

| | | | |
|---|---|---|---|
| 514,314 | 2/1955 | Italy | 192/105 CD |

*Primary Examiner*—Benjamin W. Wyche
*Attorney*—James E. Cockfield

[57] ABSTRACT

A centrifugal clutch mechanism comprising a drive member, a driven member and a plurality of centrifugally actuatable clutch shoes connected to the driving member and radially engageable with the driven member. A plurality of C-shaped springs are circumferentially mounted about the clutch shoes to maintain the shoes in a retracted posture when the driving member is idle. The plurality of C-shaped springs are positioned about the clutch shoes with open portions of the C-shaped springs staggered in order to provide a balanced restraining force on the clutch shoes.

8 Claims, 5 Drawing Figures

PATENTED OCT 30 1973　　　　3,768,611

CENTRIFUGAL CLUTCH WITH C-SPRINGS

BACKGROUND OF THE INVENTION

The invention relates to a centrifugal clutch mechanism. More particularly the invention relates to a novel centrifugal clutch and circumferential restraining spring assembly.

In general centrifugally actuated friction clutches comprise a driving member, a driven member, and a plurality of clutch shoes connected to the driving member which are radially engageable with the driven member. The driving member typically comprises a hub portion provided with a plurality of radially outwardly extending arms. The driven member comprises a drum coaxially mounted with respect to the driving member. The drum is provided with a rim which circumferentially encompasses the hub portion of the driving member. The clutch shoes are mounted about the hub between the radially extending arms and are retained in a retracted posture adjacent the hub by a circumferential coil spring. Upon rapid rotation of the driving member centrifugal force pushes the clutch shoes outwardly against the retaining spring and into frictional engagement with the rim of the driven member drum.

Illustrations of centrifugally actuated clutches of this type may be found by reference to Moore et al. U.S. Pat. No. 3,947,399; Fullerton et al. U.S. Pat. No. 3,367,464; and Hazzard U.S. Pat. Nos. 2,947,399 and 3,306,404, all assigned to the assignee of the present invention.

Centrifugally actuated clutches of the above noted type have particular utility in devices where a small gasoline engine is employed to drive a tool member such as a portable chain saw, drill, or the like. In these and other applications it is a characteristic that the application of torque to the working tool member is controlled solely by the rotational speed of the engine. In other words, no torque is applied to the tool while the engine is idling, yet substantially full torque is applied shortly after the engine attains a predetermined rotational speed.

In this connection, as the shaft of the driving engine increases in speed, centrifugal force acts upon the clutch shoes which tends to push the shoes outwardly against the tension of the spring mechanism and into frictional engagement with the rim of the clutch drum. Conversely, as the driving engine decreases in rotational speed, the tension in the spring mechanism will overcome the centrifugal force and the clutch shoes will be withdrawn from engagement with the rim of the clutch drum.

Among the most important parameters to be considered in determining the effectiveness of clutch performance is the consistency and reliability of clutch engagement at a predetermined engine speed. Furthermore, engagement of the clutch shoes with a drum rim should be maintained as nearly uniform as possible to afford a smooth clutching action and a generally even wear of the clutching surfaces.

While centrifugal clutch mechanisms, as previously noted, utilizing a circumferential coil spring have proven to be of considerable commercial impact, room for significant improvement remains.

In this respect conventional circumferential coil spring assemblies do not provide engagement speeds which are as uniform and consistently maintainable as would be desirable for optimum performance. Moreover, coil springs tend to fail at an undesirable high rate in commercial application.

Therefore it would be highly desirable to provide a centrifugal clutch mechanism which would be economical and rugged in operation, and reliable and consistent in performance while affording a smooth clutching action and a generally even wear of the clutching surfaces.

OBJECTS AND SUMMARY OF THE INVENTION

Objects

It is a general object of the invention to provide a centrifugal clutch assembly which effectively obviates or minimizes disadvantages of the type previously described.

With an overall view toward providing a smoothly and efficiently operating centrifugal clutch structure, it is a principal object of the invention to provide a clutch with a durable restoring spring mechanism which functions to consistently establish clutch engagement at substantially uniform engagement speeds.

It is a further object of the invention to provide a restoring spring mechanism which applies a uniformly distributed restraining force on the clutch shoes.

It is yet another object of the invention to provide an assemblage of C-shaped spring elements in which relative circumferential displacement of the springs is effectively minimized.

It is still another object of the invention to provide a centrifugal clutch which effectively limits axial movement of the restoring spring mechanism.

It is a still further object of the invention to provide a centrifugal clutch assembly which is reliable and longlasting, yet relatively inexpensive to manufacture, install, and operate.

Brief Summary

A centrifugal clutch mechanism intended to accomplish at least some of the above objects comprises a centrifugal clutch which is provided with a restoring spring mechanism including a plurality of nested C-shaped springs. The springs are arranged so that individual circumferential spring gaps are all staggered. Therefore, the resultant restraining force imparted to the set of C-shaped springs is applied uniformly to the clutch shoes.

In accordance with the invention, as the circumferentially offset nature of the gaps approaches a symmetrical arrangement, i.e., where the gaps are circumferentially spaced at substantially equal intervals, the resultant distribution of the restraining force to the clutch shoes becomes increasingly uniform.

In another aspect of the invention, the C-shaped springs are provided with structure for maintaining the circumferentially offset nature thereof. In this connection, and according to one preferred embodiment of the invention, the C-shaped springs include mutually cooperating nesting means for maintaining individual spring gaps in a circumferentially staggered arrangement. According to another embodiment of the invention, the C-shaped springs are provided with means, such as hooks, for attachment to the clutch shoes for maintaining the circumferentially staggered arrangement.

DRAWINGS

In describing the invention, reference will be made to preferred embodiments illustrated in the drawings in which.

Figure 4:
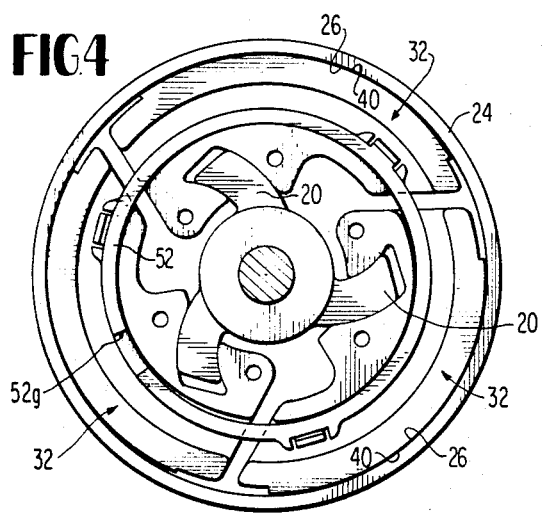
Figure 5:
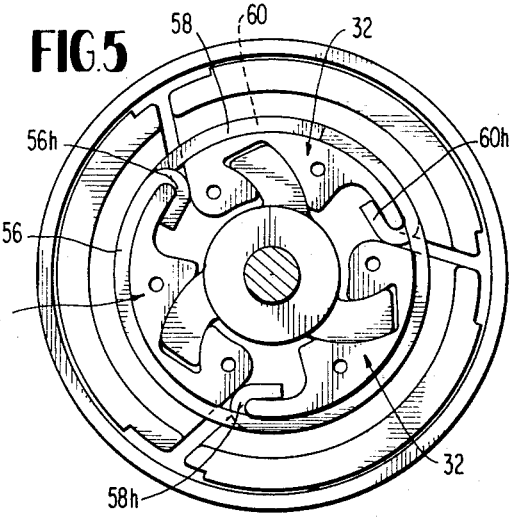

FIG. 4 is an elevational view of a centrifugal clutch according to a preferred embodiment of the invention illustrating the position of the clutch shoes in a posture radially displaced outwardly under the influence of centrifugal force to frictionally engage a driven drum; and FIG. 5 is an elevational view of a centrifugal clutch according to the present invention wherein the clutch shoes are maintained in a retracted position under the bias of a plurality of C-shaped springs according to an alternate embodiment of the invention.

DETAILED DESCRIPTION

Figure 1:
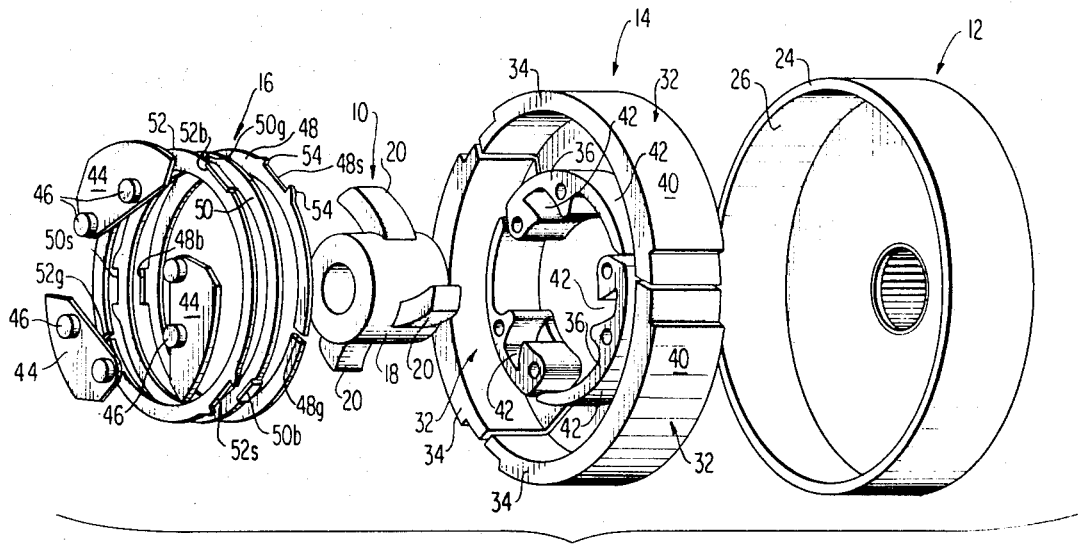
FIG. 1 is an exploded perspective view of a centrifugal clutch assembly in accordance with a preferred embodiment of the present invention.

A preferred centrifugal clutch arrangement of the subject invention is particularly illustrated in FIG. 1 and includes a driving member 10, a driven cylindrical drum member 12, torque transmitting clutch shoe means 14 and a retaining spring mechanism 16.

Figure 3:
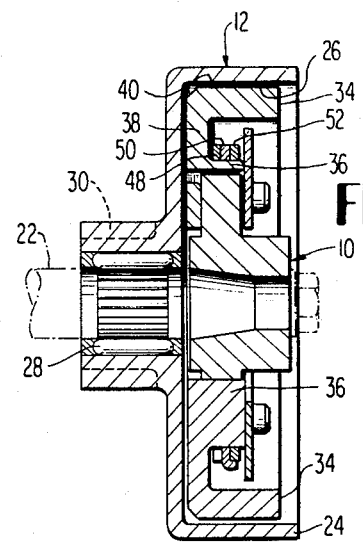
FIG. 3 is a sectional view of an assembled centrifugal clutch according to the present invention, taken along the section line 3—3 of FIG. 2.

The driving member 10 includes a hub portion 18 and a plurality of cam arms 20 projecting radially outward therefrom in a somewhat arcuate manner. As noted in FIG. 3 the driving member 10 may be directly connected to a crankshaft 22 of a power source, such as a small gasoline engine (not shown), for rotation therewith.

The driven member 12 includes an axially extending rim 24 having an interior peripheral surface 26 suitable for frictional engagement with the force transmitting clutch shoe means 14. The driven member 12 is coaxially mounted with respect to shaft 22 but spaced therefrom by bearing means 28. Therefore, the shaft 22 and driving member 10 may freely rotate or "free wheel"- 'with respect to the driven member 12.

The driven member 12 may be fashioned with a spur gear or sprocket extension 30 which is suitable in character to directly mate with a working member such as the cutting chain (not shown) of a chain saw or the like.

Positioned between the driving member 10 and the driven member 12 is a torque transmitting clutch shoe means 14 including a plurality of individual clutch shoe segments 32.

Each clutch shoe segment 32 includes an outer axially extending arcuate segment 34 and an inner axially extending arcuate segment 36. The outer segment 34 is connected to the inner segment 36 by a radially extending web 38 integrally formed with adjacent edge portions of the inner and outer arcuate segments.

The outer arcuate segment 34 is provided with a friction clutch surface 40 for torque transmitting engagement with the interior peripheral surface 26 of the driven means 12.

The inner arcuate segment 36 is provided with generally radially extending arcuate recesses 42 for intimate sliding engagement with the cam arms 20 of the driving member 10. In an assembled posture, and in response to centrifugal force produced by rotating the driving member, the clutch shoe segments 32 are operable to ride outwardly upon the cam arms 20 and into torque transmitting engagement with the driven member 12, note FIG. 4.

Figure 2:
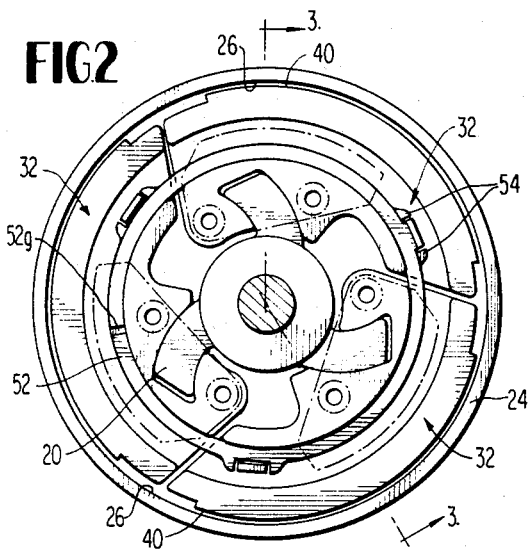
FIG. 2 is an elevational view of a centrifugal clutch wherein the clutch shoes are maintained in a retracted posture under the bias of a plurality of nested C-shaped springs according to a preferred embodiment of the invention.

In order to maintain the clutch shoe means 6 in an inwardly retracted condition, note FIG. 2, during low idling speeds of the shaft 22 and to regulate the outward engagement of the clutch shoes during a clutching operation, a retaining spring mechanism 16 is provided about the clutch shoe segments. As will be described in detail, the spring mechanism 16 comprises a plurality of C-shaped spring elements which are arranged upon a spring mounting track defined by the outer surfaces 43 of the inner arcuate clutch shoe segments 36.

In order to prevent the C-shaped spring from becoming axially displaced from the spring receiving track, each of the clutch shoe segments 32 is provided with a removable retainer plate 44. The retainer plates 44 are attachable to a respective clutch shoe segment 32 by any suitable fastener, such as a pair of screws 46 or the like. The retainer plates 44 serve to limit axial movement of the C-shaped springs with respect to the clutch shoe segments while simultaneously presenting minimal interference to radial movement of the clutch shoe segments.

Each of the C-shaped springs applies a pattern of inwardly directed restraining, or biasing, forces upon the clutch shoe segments 32. Due to the configuration of the C-shaped springs, however, the inwardly biasing forces of a single spring are not uniformly applied to all of the clutch shoes. More particularly, the forces become gradually reduced in magnitude at the interrupted portion, or gap in the C-shaped springs.

According to the present invention, however, a plurality of C-shaped springs are combined and arranged with the gaps therein mutually offset or staggered circumferentially. Such an arrangment produces a circumferentially staggared relationship of the force patterns of the individual spring elements and thus tends to produce resultant forces which are uniform about the clutch shoe segments 32. Moreover, as the circumferentially offset arrangement of the C-shaped springs approaches a symmetrical pattern, the distribution of the restraining forces applied by the spring assembly to the clutch shoe elements will become increasingly more uniform. It is in connection with such a symmetrical arrangement that the embodiments of the invention are subsequently described, although the present invention is not to be limited thereto.

In a preferred embodiment of the restraining spring assembly described in connection with FIGS. 1–4, a plurality of C-shaped springs 48, 40 and 52 are removably disposed upon the circular spring-mounting track defined by the surfaces 43. The springs are arranged side-by-side so as to be coaxial with respect to each other and with respect to the driving member 10. According to a preferred form of the invention, three C-shaped springs are utilized in combination with three clutch shoe segments 32, although it will be understood that any suitable number of clutch shoes in combination with any suitable number of C-shaped springs may be employed in accordance with the invention.

The C-shaped springs 48, 50 and 52 are disposed such that individual spring gaps 48g, 50g and 52g are circumferentially staggered or offset. An offset arrangement is shown in FIG. 1 wherein the gaps are spaced at uniform intervals, i.e., 120° apart in the case of three C-shaped springs being employed, and are thus circumferentially staggered in a symmetrical manner. By employing a plurality of C-shaped springs which are symmetrically staggered, the resultant force pattern imposed on the clutch shoe segments tends to approach a balanced condition.

In order to maintain the staggered arrangement of the C-shaped springs 48, 50 and 52, the springs, in a preferred form of the invention, are provided with mutually cooperating nesting elements. More particularly, the C-shaped springs each include axially projecting bosses 48b, 50b and 52b and boss-receiving brackets or slots 48s, 50s and 52s. The boss-receiving slots are defined by pairs of radially extending abutments 54 carried by the outer periphery of each spring. The bosses and slots of the springs are arranged such that, in an assembled condition of the springs, each spring has at least one boss or a slot in nesting engagement with a respective slot or boss of an adjacent spring. Thus, as can be seen from FIG. 1, the boss 48b engages the slot 50s to prevent relative rotation between the springs 48 and 50, and the boss 50b rests within the slot 52s to prevent relative rotation between the springs 50 and 52.

In order to provide for convenient interchangeability of springs, the springs are preferably identically constructed with a boss, slot, and gap of each spring spaced at a uniform interval about the spring circumference.

In an alternate embodiment of the invention, described in connection with FIG. 5, a plurality of C-shaped springs 56, 58 and 60 are provided with hook portions 56h, 58h and 60h at one end thereof. Each hook portion is attachably engageable with one of the clutch shoe segments 32 to prevent relative rotation between springs and thus to maintain a staggered arrangement of the springs.

Although a connection between the C-shaped springs and the clutch shoes has been described in the form of hooks, it should be understood that other suitable fastening arrangements may be employed in keeping with the teachings of the invention.

Moreover, it should be understood that within the teachings of the present invention, the C-shaped springs may be mounted on any suitable surface of the clutch shoe segments. For example, the springs could be disposed within a groove formed in the clutching surfaces 40.

OPERATION

In assembling the centrifugal clutch according to the invention, the clutch shoe segments 32 are each inserted onto a respective cam arm 20. The C-shaped springs 48, 50 and 52 are spread open slightly and slid onto the spring-receiving track defined by the inner surfaces 43. The C-shaped springs are arranged such that nesting elements thereof are engaged to maintain the gaps 48g, 50g and 52g in a mutually staggered relationship, located so that boss 52b will be between adjacent retaining plates 44. Subsequently, retaining plates 44 are attached to a respective clutch shoe segment. The clutch shoe assembly is then positioned within the driven member 12 and mounted upon shaft 22.

During operation, as long as the drive member 10 is rotating below a predetermined speed, the clutch shoe segments 32 will be held in a retracted posture by the inward bias imposed by the C-shaped springs 48, 50 and 52. The clutch shoes are stabilized through engagement of the cam arms 20 within the slots 42.

When a predetermined clutch actuating speed of the drive member 10 is attained, centrifugal force acting on the clutch shoes is sufficient to overcome the restraining effect of the C-shaped springs and the clutch shoe segments will move radially outward into torque transmitting clutching engagement with the driven member 12.

Due to the offset nature of the gaps 48g, 50g and 52g of the C-shaped springs 48, 50 and 52, the restraining force applied by the spring assembly will be evenly distributed to the clutch shoe segments 32. The clutch will thus be displaced at a uniform rate, resulting in a smooth clutching operation.

Conversely, upon a predetermined reduction in the rotational speed of the driving member 10, the clutch shoe segments will be displaced inwardly under the bias of the C-shaped springs.

Upon initiation of subsequent clutching operations, the subject spring assembly is operable to exert generally the same restraining forces on the clutch shoe segments as exhibited in previous operations to afford substantially the same engagement speeds of the clutch assembly.

During operation of the clutch, the staggared arrangement of the springs is maintained through the interaction between the nesting elements b and s according to one embodiment of the invention (FIGS. 1–4), or by means of the hook attachments h in accordance with an alternate embodiment of the invention (FIG. 5). Moreover, axial displacement of the springs is limited by the retaining plates 44. The provision of a plurality of retaining plates attached directly to the clutch shoe segments for movement therewith prevents the creation of radial friction forces between the plate and clutch shoe during radial movement of the clutch shoes, while affording a convenient assembly and disassembly of the spring apparatus.

MAJOR ADVANTAGES OF THE INVENTION

The present invention provides a C-shaped restoring spring mechanism for a centrifugal clutch assembly which is durable in nature and which applies a uniformly distributed restraining bias to the clutch shoe segments. Moreover, the bias is consistently maintained over successive clutching operations. The result is a smooth and precisely regulated clutching action with even wear of the clutching surfaces.

The nesting engagement of the springs in one instance and the connection of the springs to the clutch shoe segements in another instance, conveniently enables an advantageous offset arrangement of the C-shaped springs to be maintained.

The utilization of retaining plates which are connected directly to the individual clutch shoe segments enables axial movement of the C-shaped springs to be limited without interfering with displacement of the clutch shoes while affording a convenient assembly and disassembly system.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A clutch mechanism comprising:
   driving means including a hub means;
   driven means including a clutch drum means;
   a plurality of centrifugally responsive clutch shoe means operably carried by said driving means for radial displacement toward driving engagement with said clutch drum means;
   retaining spring means including a plurality of C-shaped spring elements, having a circumferential gap in each spring element, operably connected to said clutch shoe
   means for applying a radial inward bias hereto; and
   said plurality of C-shaped spring elements being arranged with said gaps circumferentially staggered to provide a distribution of the biasing forces applied to said clutch shoe means by individual spring elements including,
   means interconnecting said plurality of C-shaped spring elements for maintaining a circumferentially staggered relationship of the gaps of said individual C-shaped spring elements.

2. A clutch mechanism as defined in claim 1 and further including:
   a plate means removably connected to each of said clutch shoe means to define a stop means therein for limiting axial movement of said C-shaped spring elements.

3. A clutch mechanism comprising:
   driving means;
   driven means;
   a plurality of centrifugally responsive clutch shoes operably carried by said driving means for outward displacement and force-transmitting engagement with said driven means; and
   retaining spring means comprising a plurality of C-shaped spring elements operatively engaging said clutch shoes for biasing said clutch shoes radially away from said driven means wherein,
   each of said spring elements includes a gap in the circumference thereof and said C-shaped spring elements being arranged such that said gaps are circumferentially symmetrically disposed to apply a substantially uniform biasing force to said plurality of clutch shoe means and the number of said spring elements corresponds in number to said plurality of clutch shoes and
   positive connecting means for connecting each spring element to a responsive one of said plurality of clutch shoe means to maintain the circumferentially symmetrically disposed relationship of said gaps in said plurality of C-shaped spring elements.

4. A clutch mechanism comprising:
   driving means including a hub means;
   driven means including a clutch drum means;
   a plurality of centrifugally responsive clutch shoe means operably carried by said driving means for radial displacement toward driving engagement with said clutch drum means;
   retaining spring means including a plurality of C-shaped spring elements, having a circumferential gap in each spring element, operably connected to said clutch shoe means for applying a radial inward bias thereto;
   said plurality of C-shaped spring elements being arranged with said gaps circumferentially staggered to provide a distribution of the biasing forces applied to said clutch shoe means by individual spring elements; and
   said plurality of C-shaped spring elements each including,
   an axially projecting boss means; and
   a circumferentially spaced radially extending bracket means operable to receive a boss of an adjacent C-shaped spring element to maintain the circumferential stagger of said gaps in said individual spring elements.

5. A clutch mechanism comprising:
   driving means including a hub means;
   driven means including a clutch drum means;
   a plurality of centrifugally responsive clutch shoe means operably carried by said driving means for radial displacement toward driving engagement with said clutch drum means;
   each of said clutch shoe means includes
   an arcuate clutching surface, and
   a curved inner surface disposed radially inwardly of said clutching surface;
   the inner surfaces of said clutch shoe means being arranged to define a generally circular spring-mounting track;
   retaining spring means including a plurality of C-shaped spring elements, having a circumferential gag in each spring element, operably connected to said clutch shoe means for applying a radial inward bias thereto;
   said plurality of C-shaped spring elements being arranged with the gaps therein symmetrically offset circumferentially and being mounted upon said spring mounting track to provide a distribution of the biasing forces applied to said clutch shoe means by individual spring elements; and
   each of said C-shaped spring elements includes:
   an axially projecting boss means, and
   a radially extending bracket means operable to receive a boss means of an adjacent C-shaped spring element, said C-shaped spring elements being arranged such that at least one of said boss means or said bracket means of said C-shaped spring element nestingly engages at least one of said boss means or said bracket means of an adjacently disposed C-shaped spring element to resist relative circumferential displacement of said C-shaped spring elements.

6. A clutch mechanism comprising:
   driving means including a hub means;
   driven means including a clutch drum means;
   a plurality of centrifugally responsive clutch shoe means operably carried by said driving means for radial displacement toward driving engagement with said clutch drum means;
   retaining spring means including a plurality of C-shaped spring elements, having a circumferential gap in each spring element, operably connected to said clutch shoe means for applying a radial inward bias thereto;
   said plurality of C-shaped spring elements being arranged with said gaps circumferentially staggered to provide a distribution of the biasing forces applied to said clutch shoe means by individual spring elements; and
   hook means carried at one end of each of said C-shaped spring elements and attachingly engageing a portion of a respective one of said plurality of clutch shoe means to maintain the circumferentially staggered relationship of said gaps in said plurality of C-shaped spring elements.

7. A clutch mechanism comprising:
driving means including a hub means;
driven means including a clutch drum means;
a plurality of centrifugally responsive clutch shoe means operably carried by said driving means for radial displacement toward driving engagement with said clutch drum means, each of said clutch shoe means includes
an arcuate clutching surface, and
a curved inner surface disposed radially inwardly of said clutching surface;
the inner surfaces of said clutch shoe means being arranged to define a generally circular spring mounting track;
retaining spring means including a plurality of C-shaped spring elements, having a circumferential gap in each spring element. operably connected to said clutch shoe means for applying a radial inward bias thereto;
said plurality of C-shaped spring elements being arranged with the gaps therein symmetrically staggered circumferentially to provide a distribution of the biasing forces applied to said clutch shoe means by individual spring elements; and
each of said plurality of C-shaped spring elements includes
hook means carried at one end thereof and attachingly engageable with a portion of a respective clutch shoe means to maintain a symmetrical arrangement of said C-shaped spring elements.

8. A clutch mechanism as defined in claim 7 and further including:
a plate means removably connected to each of said clutch shoe means to define a stop means thereupon for limiting axial movement of said C-shaped spring elements.

* * * * *

UNITED STATES PATENT OFFICE
CERTIFICATE OF CORRECTION

Patent No. 3,768,611　　　　　　　　Dated October 30, 1973

Inventor(s) Robert Eugene Frederickson

It is certified that error appears in the above-identified patent and that said Letters Patent are hereby corrected as shown below:

In the Abstract, line 1, change "drive" to --driving--.

Column 1, line 27, change "3,947,399" to --2,947,399--;

Column 4, line 17, change "spring" to --springs--.

Column 4, line 54, change "40" to --50--.

Signed and sealed this 6th day of August 1974.

(SEAL)
Attest:

McCOY M. GIBSON, JR.　　　　　　C. MARSHALL DANN
Attesting Officer　　　　　　　　Commissioner of Patents